No. 755,028. PATENTED MAR. 22, 1904.
S. A. MAXWELL.
DIE OPENING MECHANISM.
APPLICATION FILED DEC. 22, 1902.
NO MODEL. 3 SHEETS—SHEET 1.
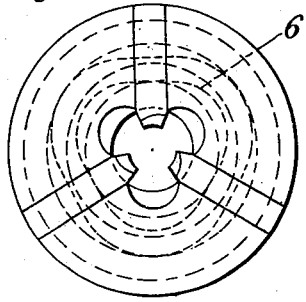
Fig. 1
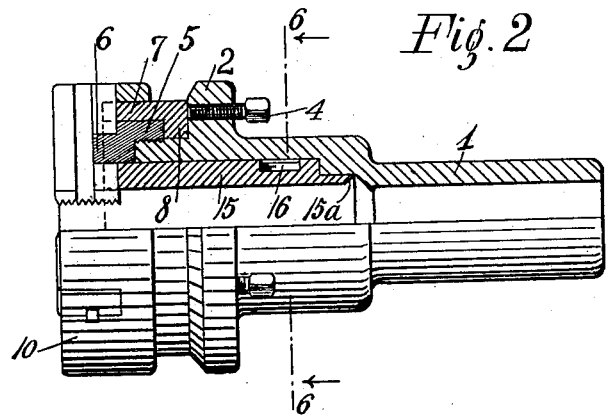
Fig. 2
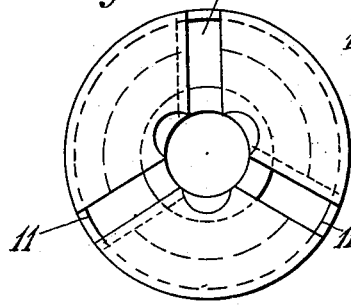
Fig. 3
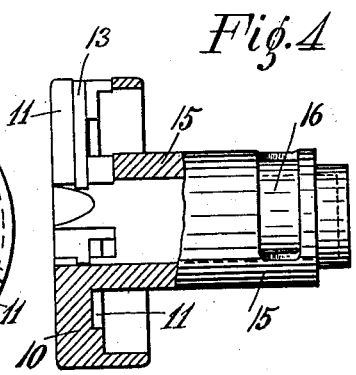
Fig. 4
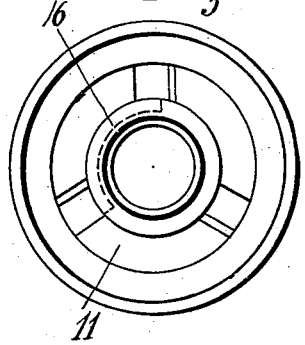
Fig. 5
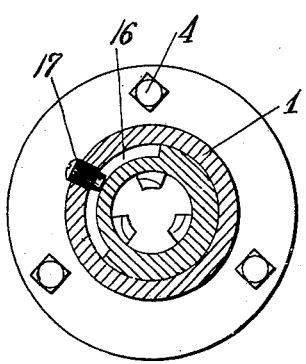
Fig. 6
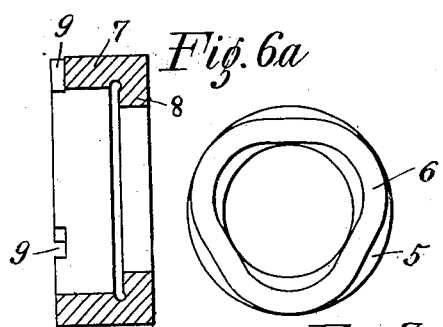
Fig. 6a  Fig. 7  Fig. 8
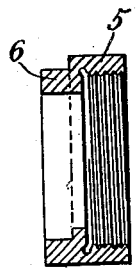
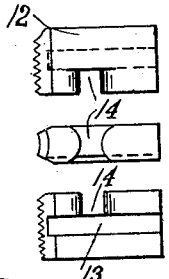
Fig. 9
Witnesses
Julian T. Wooster.
George N. Kerr.
Singleton A. Maxwell, Inventor
By his Attorney
C. V. Edwards.

No. 755,028. PATENTED MAR. 22, 1904.
S. A. MAXWELL.
DIE OPENING MECHANISM.
APPLICATION FILED DEC. 22, 1902.
NO MODEL. 3 SHEETS—SHEET 2.
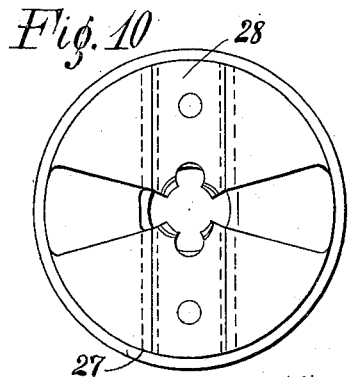
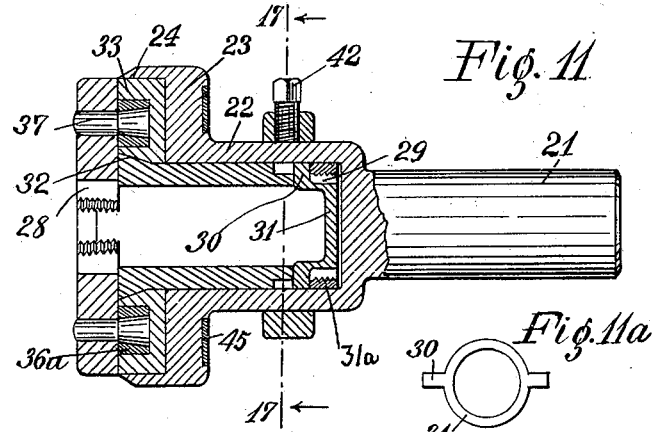
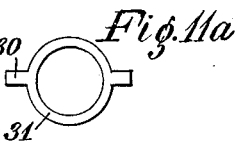
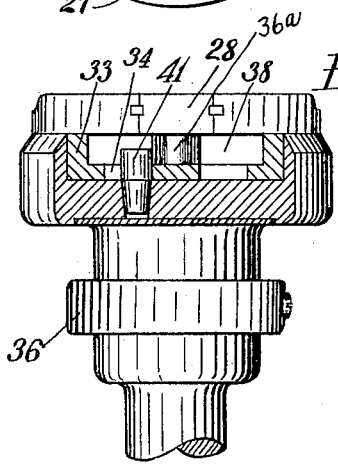
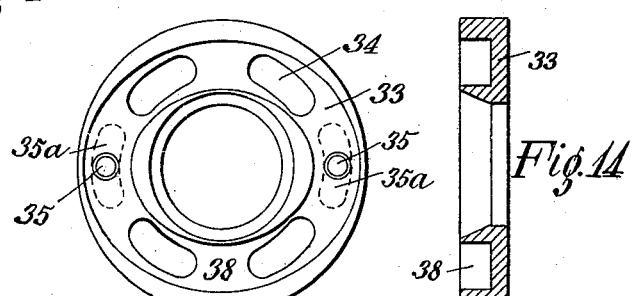
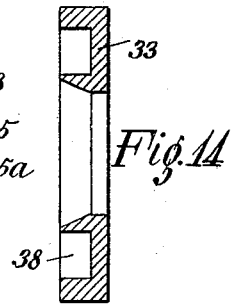
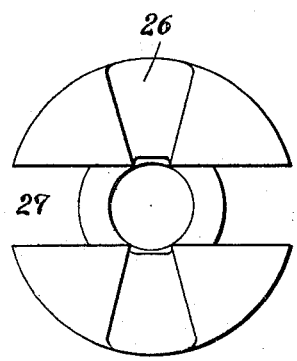
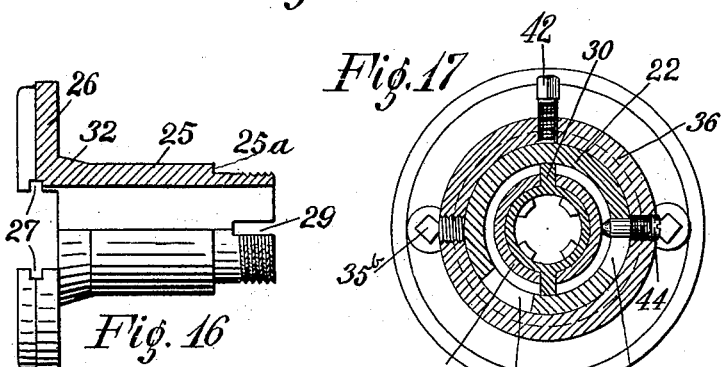
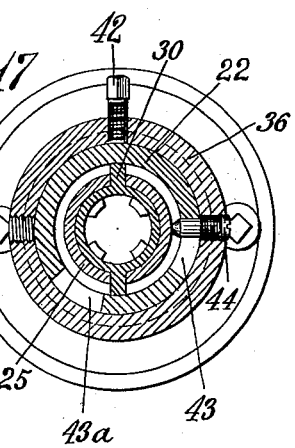
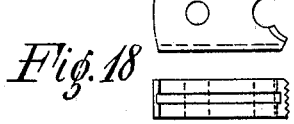
Witnesses
Julian S. Wooster
George N. Ken
Singleton A. Maxwell Inventor
By his Attorney
C. W. Edwards No. 755,028. PATENTED MAR. 22, 1904.
S. A. MAXWELL.
DIE OPENING MECHANISM.
APPLICATION FILED DEC. 22, 1902.
NO MODEL. 3 SHEETS—SHEET 3.
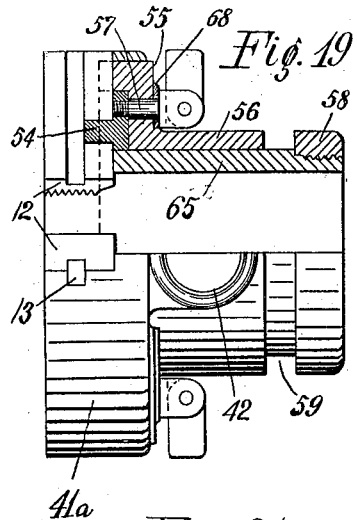
Fig. 19
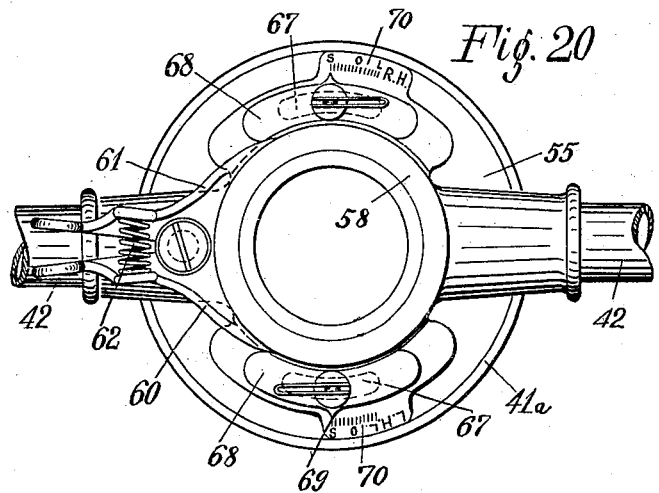
Fig. 20
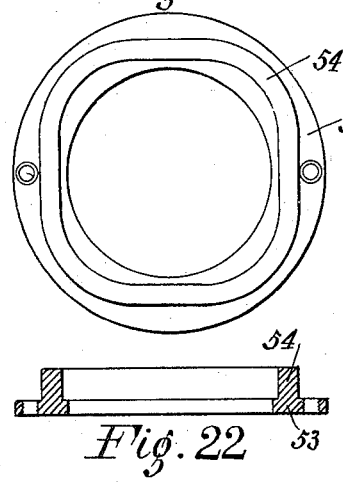
Fig. 21
Fig. 22
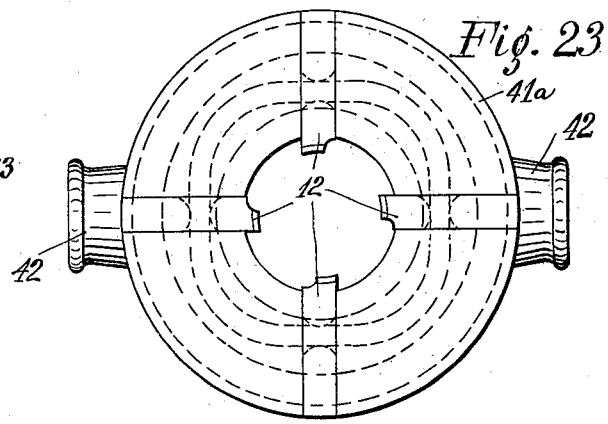
Fig. 23
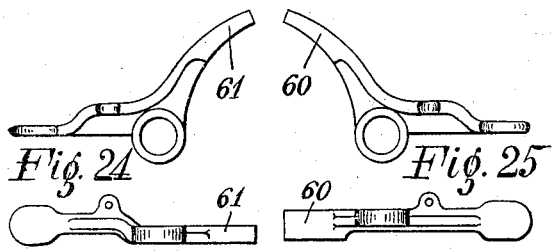
Fig. 24  Fig. 25
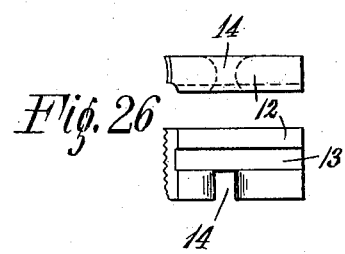
Fig. 26
Witnesses
Julian T. Wooster
George N. Kerr
Singleton A. Maxwell Inventor
By his Attorney C. N. Edwards No. 755,028. Patented March 22, 1904.

UNITED STATES PATENT OFFICE.

SINGLETON A. MAXWELL, OF ATLANTA, GEORGIA, ASSIGNOR TO IDEAL OPENING DIE COMPANY, A CORPORATION OF NEW YORK.

DIE-OPENING MECHANISM.

SPECIFICATION forming part of Letters Patent No. 755,028, dated March 22, 1904.

Application filed December 22, 1902. Serial No. 136,180. (No model.)

*To all whom it may concern:*

Be it known that I, SINGLETON A. MAXWELL, a citizen of the United States, residing at Atlanta, in the county of Fulton and State of Georgia, have invented certain new and useful Improvements in Die-Opening Mechanism, of which the following is a full, clear, and exact specification.

This invention relates to improvements in mechanism for opening dies, and effects the simplification thereof, whereby the number of parts is lessened and there is less liability of derangement or breakage.

Referring to the annexed drawings, Figure 1 is an end view of my improved die adapted for a turret. Fig. 2 is a partial longitudinal cross-section thereof. Figs. 3, 4, and 5 are views of the die-head from the left, side, and right, respectively. Fig. 6 is a cross-section on the line 6 6 of Fig. 2. Fig. 6ª is a cross-section of the clutch-sleeve. Figs. 7 and 8 are detail views of the cam which I use to operate the dies. Fig. 9 shows detail views of the dies. Fig. 10 is a front view of a modified form. Fig. 11 is a longitudinal cross-section of the modification shown in Fig. 10. Fig. 11ª is a detail of a locking-ring. Fig. 12 is a partial cross-section of the form shown in Fig. 10. Figs. 13 and 14 are details of the cam for operating the die-sections. Figs. 15 and 16 are details of the die-head shown in Fig. 10. Fig. 17 is a cross-section on the line 17 17 of Fig. 11. Fig. 18 is a view of a different form of die. Fig. 19 is a partial cross-section of my invention applied to a hand-operated die-stock. Fig. 20 is a plan view. Figs. 21 and 22 are detail views of the operating-cam. Fig. 23 is a view looking from the left of Fig. 19. Figs. 24 and 25 are detail views of the releasing-latches, and Fig. 26 is a view of a die similar to that in Fig. 9.

Heretofore die-opening mechanisms have been complicated and subjected to disarrangement and have, so far as I am aware, involved the use of springs for controlling the movements of the dies in whole or in part.

The object of this invention is to simplify the construction of die-opening mechanism and do away with the use of springs by providing a mechanism which controls the dies positively, thereby securing numerous advantages in manufacture and use.

Another object of the invention is to provide a mechanism which shall be adapted to automatically remove the bur, and to accomplish this I propose to limit the expansion of the dies, so that they will just clear the work, instead of, as heretofore, expanding the dies to their extreme limit whether the work be of large or small diameter.

I have shown the invention applied to several forms of die-opening mechanism and have embodied the use of cams for operating the dies positively. In the form shown in Figs. 2 and 11 the dies are opened automatically by the continued rotation of the work after the feed has stopped, while the hand-die (shown in Fig. 20) is of course not automatic, though the dies are controlled by substantially the same mechanism as in the automatic dies.

Referring more particularly to Figs. 1 to 9, inclusive, 1 represents the usual stock, which is adapted to be attached to a turret in any suitable manner. The stock 1 has a shoulder 2 and is threaded at its forward end. A collar 5, carrying a number of cams 6 corresponding to the number of dies, is threaded on the forward end of the stock and clamps in place a clutch-sleeve against the shoulder 2. (See Figs. 2, 7, and 8.) As shown in Fig. 6ª, this sleeve comprises a barrel 7, which surrounds the collar 5, and the shoulder 8, which is held between the shoulder 2 and the collar 5. On the end of the barrel are cut notches or clutch-teeth 9, adapted to engage the dies. By reference to Fig. 2 it will be seen that the end of the barrel 7 does not project as far as the end of the cams 6. The clutch-sleeve is held rigidly in position by means of set-screws 4 and can be adjusted angularly when desired. 10 is the die-head, which is mounted on the stock so as to have a limited longitudinal and adjustable rotary motion. The die-head has grooves 11, in which the dies or chasers 12 are splined. The dies 12 (see Fig. 9) have a longitudinal groove 13, which engages with a tongue to keep the dies attached to the die-head, but permitting radial movement. Each die has a transverse groove 14 on its rear side, which engages with the cams 6. (See Figs. 1 and 2.) The die-head 10 is carried on the sleeve 15, which fits within the stock 1 and is connected to the stock by means of a pin 17 and the peripheral slot 16. The slot 16 is sufficiently wide to permit the die-head to have longitudinal movement and sufficiently long to permit the dies to be expanded by the cams 6. The end of the sleeve 15 is beveled, as at 15$^a$, so that chips will not be caught between the sleeve and the stock.

Assuming the parts to be in the position shown in Figs. 1 and 6, the operation will now be described. The stock 1 is clamped in a turret, which may be free to move longitudinally a certain distance. In cutting a thread of standard diameter the dies will be at a point between the lowest and highest portions of the cams 6. In this position the die-head is locked to the stock by the engagement of the dies with the clutch-teeth 9 of the clutch-barrel 7, and the dies are prevented from moving radially by the cams. The work to be threaded is rotated by any suitable means, and the die-head is fed forward in the usual manner until a predetermined point is reached, when the turret stops, thus preventing the stock from moving farther. The continued rotation of the work and the engagement of the dies therewith causes the dies and die-head to continue the forward movement until the dies disengage from the clutch-teeth 9, the pin 17 traveling transversely of the slot 16 to permit this. As soon as the dies have disengaged from the clutch-teeth 9 the die-head is free to turn and in so doing expands the dies, it being understood that the cams 6, being on the stock, do not turn. The removal of the bur is effected by limiting the expansion of the dies according to the diameter of the work, so that when the dies are expanded there will be a very slight clearance and the bur will be broken off by striking the dies. The adjustment for limiting the expansion of the dies will be more fully described hereinafter in connection with the form of the invention shown in Figs. 10 to 18, which construction is applicable to the form just described. This is an important advantage of this invention, as in the dies heretofore in use the bur was not removed by the dies, because their expansion could not be controlled to suit different diameters of work.

It will of course be understood that the operation of this die depends upon the continued rotation either of the die or the work after the feed has stopped, and this may be accomplished in various ways.

The shoulder 2 may carry a scale which registers with an index-line on the clutch-barrel 7, so that the depth of cut can be regulated, as when it is desired to cut a standard thread or a thread deeper than standard, which may be done by changing the position of the cam and the clutch-sleeve.

Referring to Figs. 10 to 18, 21 is a stock which is adapted to be held in a turret, as before described. The stock has an enlarged hollow portion 22 and a head 23, having a flange 24. The die-head comprises a cylindrical sleeve 25, having a head 26 and the guideways 27 for the dies 28 splined therein. The inner end of the die-head is reduced and threaded, as shown in Fig. 16. 29 are opposite slots, into which the wings 30 of the ring 31 (see Fig. 11$^a$) project. 31$^a$ is a nut for locking the ring 31 in the slots 29. (See Fig. 11.) The sleeve 25 has a conical portion 32, on which rests cam-ring 33, having slots 34 and attached to the stock 23 by screws 35$^b$, tapped in holes 35. These screws pass through slots 35$^a$ in the head 23, so that the cam-ring can be angularly adjusted. The cam-ring 33 is shown in Figs. 13 and 14 and has an elliptical groove 38 forming cams, in which groove the rolls 36$^a$, attached to the dies by pins 37, travel. By adjusting this ring angularly the dies and the depth of cut are controlled, as in the case of the cams 6. Attached to the stock are pins 41, which project through the slots 34 in the base of the cam-ring into the path of the rollers 36. It will be observed that the cam-ring 33 has two pairs of diametrically opposite slots 34. One of these pairs is used when right-hand threads are being cut and the other when left-hand threads are being cut, so as to allow play for the pins 31 in either direction. It will be observed that the pins 41 are shorter than the rollers, so that when the die-head sleeve has moved longitudinally between the shoulder 25$^a$ and the nut 31$^a$ the rollers 36 will clear the ends of the pins 41 to permit the dies, to be expanded by rotation of the die-head. Mounted on the reduced portion 22 of the stock 21 is a collar 36, having a set-screw 42 for locking it in position. The collar 36 carries a detachable pin 44, which projects through the slot 43 of the stock 22 into the space between the reduced portion of the die-head sleeve 25 and the nut 31$^a$. The end of the screw 43 is therefore in the path of the wings 30 when the rollers 36$^a$ clear the pins 41 or when the die-head and stock are disengaged. By adjusting the pin 44 in the slot 43 the travel of the wings 30 will be controlled, and thereby the expansion of the dies. In this manner the throw of the cams can be controlled according to the diameter of the work. Whatever projecting burs there are will be broken off by the dies as the work rotates on account of the close proximity of the dies to the work. In the form illustrated in Fig. 6 the throw of the cams can be controlled in the same manner by mounting the pin 17 on the ring similarly to the pin 44. This adjusting means can be applied to various forms of dies; but for convenience I have chosen to show it applied to the dies shown in Fig. 11, though I do not limit myself to its application to this form only. The operation will be clear from the foregoing description.

Referring to Figs. 11, 12, and 17, the parts are in cutting position, with the rolls 36ª abutting against the pins 41, thus forming a driving connection. When the end of the work is reached, the feed stops. The continued rotation feeds the die-head forward until the rolls 36ª can clear the end of the pins 41. At the same time the end of the pin 44 is brought into the path of one of the wings 30. As soon as the die-head turns the cams will spread the dies, and the pin 44 prevents the cams from throwing the dies in again by continued rotation. This same function is performed by the ends of the slot 16 in Fig. 4. In order to separate the die-head and stock, it is only necessary to remove the pin 17 in Fig. 6 or the pin 44 in Fig. 17.

In the two forms which I have just described it will be seen that the die opens automatically as soon as the feed is stopped. In the hand form I am about to describe the dies are not opened automatically but are controlled by substantially the same mechanism. In the hand form of die I use latches for releasing the die-head from the stock, and I also contemplate the use of the forms of automatic die previously described in a hand-die, as would be obvious to a skilled mechanic.

Referring to Figs. 19 to 26, 41ª is a die-head in which are mounted the dies 12 in the same manner as previously described in Fig. 9. The cams 54 are similar to the cams 6, and the clutch-sleeve 55 has clutch-teeth similar to the clutch-sleeve 7 and is clamped to the cam-ring by set-screws 57, which pass through slots 67 in the clutch-sleeve, so that they can be angularly adjusted. The sleeve 56 of the clutch-ring 55 slides on the cylindrical portion 65 of the die-head and carries the handles 42. The end of the die-head is threaded and has a collar 58 screwed on. Pivoted on the die-head are latches 60 61, controlled by a spring 62. The end of the latch 60 is just sufficiently wide to fill the space 59 between the collar 58 and the end of the clutch-sleeve 56 to hold the parts in the position shown in Fig. 19. When it is desired to open the die, the latch 60 is operated, which allows the die-head to move longitudinally until it strikes the narrow latch 61. This movement is sufficient to disengage the dies from the clutch-teeth, and by turning the die-head the cams will expand the dies. When it is desired to entirely disengage the cam from the dies, both latches are released. 68 68 are cover-plates for the slots 67 and carry indices 69, which point on scales 70 on the die-head. The upper scale indicates adjustment for right hand threads and the lower scale left hand threads. The letter *s* indicates the position for the standard thread and the letter *o* a diameter smaller than standard thread.

It will be seen from the foregoing description that I have provided a die-opening mechanism which can be adjusted to cut right and left hand threads of standard diameter or of greater or less than standard diameter, as may be desired, and it will be furthermore observed that the expansion of the dies can be adjusted or that the expansion of the dies can be regulated, according to the diameter of the work.

Modifications and changes may be made without departing from the scope of the invention, and I do not desire to be limited to the precise construction which I have described.

Having thus described my invention, I declare that what I claim as new, and desire to secure by Letters Patent, is—

1. In a die-opening mechanism, a stock, a head carrying collapsible dies, and mounted to have a rotary movement relative to the stock, releasable means for engaging the head and the stock, and coöperative connections between the dies and the stock arranged to expand the dies by relative rotation of the head and the stock when the engagement of the head and stock is released, substantially as described.

2. The combination with a stock having die-expanding means, of a die-head adapted to releasably engage said stock and carrying expansible dies engaging said expanding means, said die-head being mounted to have longitudinal and rotary movement relatively to the stock, and means permitting disengagement of the stock and die-head to expand the dies, substantially as described.

3. In a die-opening mechanism, a stock having cams fixed thereto, a die-head carrying movable dies arranged to be engaged by the cams, clutch connections between the head and the stock adapted to lock the dies in cutting position, and means permitting the connection to be released and the dies expanded by the cams upon rotary movement of the die-head, substantially as described.

4. In a die-opening mechanism, a stock having cams fixed thereto, a die-head carrying movable dies controlled by the cams, clutch connections between the head and the stock adapted to lock the dies in cutting position and to permit disengagement of the die-head by longitudinal movement, so as to permit the dies to expand by rotary movement, substantially as described.

5. In a die-opening mechanism, a die-head carrying movable dies, a stock having means controlling the dies, the head and stock being connected so as to permit rotary and longitudinal movement of the die-head, means for locking the die-head against rotary movement and means permitting the die-head to be released and the dies expanded by the rotation of the die-head, substantially as described.

6. In a die-opening mechanism, a die-head having dies, and mounted to have longitudinal and rotary movement, a stock having a clutch for engaging the die-head to prevent rotary movement, means permitting disengagement of the die-head and stock by longitudinal movement, and cams on the stock for controlling the dies, substantially as described.

7. In a die-opening mechanism, the combination with a stock carrying a clutch and adjustable cams, of a die-head adapted to be held from rotation by the clutch and carrying dies engaged by the cams, a connection between the stock and die-head permitting rotary and longitudinal movement of the die-head, the cams moving the dies when the die-head is disengaged and rotated, substantially as described.

8. In a die-opening mechanism, the combination with a stock having a clutch and fixed cams, of a die-head carrying movable dies engaged by said cams, the die-head being mounted to have longitudinal and rotary movement and engaging said clutch to prevent rotation, said clutch permitting the die-head to be moved longitudinally and rotated to expand the dies, substantially as described.

9. In a die-opening mechanism, a stock having a clutch and fixed cams projecting beyond the clutch, a die-head carrying movable dies controlled by the cams and having means adapted to engage the clutch to lock the dies in cutting position, and means permitting the longitudinal movement of the die-head to disengage the die-head, and rotary movement to expand the dies, substantially as described.

10. In a die-opening mechanism, the combination with a stock, of a die-head carrying movable dies and mounted to move longitudinally and to rotate, means for locking the die-head and stock to prevent relative rotation and means comprising cams fixed on the stock for controlling the dies when the die-head is disengaged and free to rotate, substantially as described.

11. In a die-opening mechanism, the combination with a stock carrying fixed cams, of a die-head connected to the stock so as to have a limited longitudinal and rotary movement, and carrying movable dies controlled by said cams, means for locking the die-head to the stock, and means permitting the release and rotation of the die-head to expand the dies, substantially as described.

12. In a die-opening mechanism, the combination of a stock, a die-head adapted to engage the stock and lock the dies, movable dies in the die-head, means permitting the disengagement and rotation of the die-head, and means fixed on the stock for expanding the dies as the head rotates, substantially as described.

13. In a die-opening mechanism, the combination of a tubular stock, a die-head having a sleeve carried in the stock and attached thereto by a pin projecting into a slot in the die-head sleeve so as to have limited longitudinal and rotary movement, cams on said stock, a clutch-ring adapted to engage said die-head and locked to the stock by said cams, dies in the die-head engaging with said cams, and means permitting the release and rotation of the die-head to open the dies, substantially as described.

14. A die-holder, expansible dies therein, means whereby they may be simultaneously expanded, and means for adjustably limiting said expansion to an amount equal to the depth of the thread.

15. In a die-opening mechanism, the combination with a stock, of a die-head carrying expansible dies, and adjustable means for limiting the expansion of the dies so as to just clear the work, substantially as described.

16. In a die-opening mechanism, the combination with a stock, of a die-head rotatably mounted thereon and carrying expansible dies controlled by the rotation of the die-head, and means for varying the rotation of the die-head according to the diameter of the work, substantially as described.

17. In a die-opening mechanism, the combination of a stock, a die-head rotatably mounted on said stock carrying dies, an angularly-adjustable pin on one of said parts coöperating with limiting means on the other part, and die-expanding means arranged to be rendered effective by the rotation of the die-head, substantially as described.

18. In a die-opening mechanism, the combination with a stock-carrying die-expanding means, of a rotatable die-head carrying expansible dies, means for locking the dies by locking the die-head against rotation, and means permitting the die-head to be released and rotated to expand the dies, substantially as described.

In testimony whereof I affix my signature in presence of two witnesses.

SINGLETON A. MAXWELL.

Witnesses:
C. V. EDWARDS,
JULIAN S. WOOSTER.